US010815408B2

(12) United States Patent
Zook et al.

(10) Patent No.: US 10,815,408 B2
(45) Date of Patent: Oct. 27, 2020

(54) CURABLE COMPOSITIONS AND RELATED METHODS

(71) Applicant: 3M INNOVATIVE PROPERTIES COMPANY, St. Paul, MN (US)

(72) Inventors: Jonathan D. Zook, Stillwater, MN (US); David A. Ylitalo, Stillwater, MN (US); Alla Yankovsky, Huntington Beach, CA (US); Audrey B. Nguyen, Westminster, CA (US); Susan E. DeMoss, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/336,169

(22) PCT Filed: Oct. 2, 2017

(86) PCT No.: PCT/US2017/054730
§ 371 (c)(1),
(2) Date: Mar. 25, 2019

(87) PCT Pub. No.: WO2018/067443
PCT Pub. Date: Apr. 12, 2018

(65) Prior Publication Data
US 2019/0241782 A1    Aug. 8, 2019

Related U.S. Application Data (60) Provisional application No. 62/404,968, filed on Oct. 6, 2016.

(51) Int. Cl.
| | | |
|---|---|---|
| C08L 81/04 | (2006.01) | |
| C09K 3/10 | (2006.01) | |
| C08G 75/14 | (2006.01) | |
| C09J 181/04 | (2006.01) | |
| C08G 75/02 | (2016.01) | |

(52) U.S. Cl.
CPC ............ *C09K 3/1012* (2013.01); *C08G 75/02* (2013.01); *C08G 75/14* (2013.01); *C08L 81/04* (2013.01); *C09J 181/04* (2013.01); *C08L 2205/025* (2013.01); *C08L 2205/035* (2013.01); *C08L 2205/20* (2013.01); *C09K 2200/0217* (2013.01); *C09K 2200/0239* (2013.01); *C09K 2200/0247* (2013.01); *C09K 2200/0682* (2013.01)

(58) Field of Classification Search
CPC .. C09K 3/1012; C08G 75/02; C08G 75/7512; C08G 75/12; C08G 75/14; C08L 81/04; C08L 2205/025; C08L 2205/20; C09J 181/04; C08K 2200/0217
USPC ........................................................ 523/218
See application file for complete search history.

(56) References Cited

U.S. PATENT DOCUMENTS

| | | | |
|---|---|---|---|
| 2,466,963 A | 4/1949 | Patrick | |
| 2,789,958 A | 4/1957 | Fettes | |
| 4,020,033 A * | 4/1977 | Dannels | ................ C08G 75/14 |
| | | | 524/730 |
| 4,165,425 A | 8/1979 | Bertozzi | |
| 4,281,092 A | 7/1981 | Breazeale | |
| 4,366,307 A | 12/1982 | Singh | |
| 4,609,762 A | 9/1986 | Morris | |
| 5,082,147 A | 1/1992 | Jacobs | |
| 5,225,472 A | 7/1993 | Cameron | |
| 5,272,377 A | 12/1993 | Shimozawa | |
| 5,527,861 A | 6/1996 | Logothetis | |
| 5,610,243 A | 3/1997 | Vietti | |
| 5,648,407 A | 7/1997 | Goetz | |
| 5,912,319 A | 6/1999 | Zook | |
| 5,959,071 A | 9/1999 | DeMoss | |
| 6,172,179 B1 | 1/2001 | Zook | |
| 6,509,418 B1 | 1/2003 | Zook | |
| 6,709,748 B1 | 3/2004 | Ho | |
| 7,262,245 B2 | 8/2007 | Bons | |
| 7,645,840 B2 | 1/2010 | Zook | |
| 8,568,850 B2 | 10/2013 | Zook | |
| 8,816,023 B2 | 8/2014 | Anderson | |
| 9,221,970 B2 | 12/2015 | Schultz | |
| 2004/0097643 A1 | 5/2004 | Bons | |
| 2004/0152866 A1 | 8/2004 | Cosman | |

(Continued)

FOREIGN PATENT DOCUMENTS

| | | |
|---|---|---|
| EP | 0971369 | 1/2000 |
| JP | 2007161506 | 6/2007 |
| WO | WO 2001-066642 | 9/2001 |

(Continued)

OTHER PUBLICATIONS

Odian, *Principles of Polymerization*—Second Edition, (1981).

(Continued)

*Primary Examiner* — Hannah J Pak
(74) *Attorney, Agent, or Firm* — Philip P. Soo (57) ABSTRACT

Provided are two-component curable compositions and methods thereof. The composition includes a base component comprised of a curable resin and a first compressible filler dispersed therein. The composition further includes a curative component comprised of a curing agent and a second compressible filler dispersed therein. The base and curative components react with each other upon mixing to provide a crosslinked network. When used with automated metering pumps, the compressibility of the base and curing agent components can be matched, allowing for a constant mix ratio despite variability in applied pressure.

11 Claims, 1 Drawing Sheet

(56) References Cited

U.S. PATENT DOCUMENTS

2007/0096396 A1* 5/2007 Sawant .................. C09J 181/02
 277/312
2016/0244590 A1* 8/2016 Takada ................... C08K 3/346

FOREIGN PATENT DOCUMENTS

WO    WO 2007-050725    5/2007
WO    WO 2012-154132    11/2012

OTHER PUBLICATIONS

Visakh, *Advances in Elastomers I: Blends and Interpenetrating Networks*, (2013).
International Search Report for PCT International Application No. PCT/US2017/054730, dated Dec. 20, 2017, 6 pages.

* cited by examiner

CURABLE COMPOSITIONS AND RELATED METHODS

CROSS REFERENCE TO RELATED APPLICATIONS

This application is a national stage filing under 35 U.S.C. 371 of PCT/US2017/054730, filed Oct. 2, 2017, which claims the benefit of U.S. Provisional Patent Application No. 62/404,968, filed Oct. 6, 2016, the disclosures of which are incorporated by reference in their entirety herein.

FIELD OF THE INVENTION

Provided are curable compositions and related methods. More particularly, the provided curable compositions can be useful as sealants in aerospace applications.

BACKGROUND

Curable sealants have diverse applications the aircraft industry. Principal uses include sealing of integral fuel tanks and cavities, sealing of the passenger cabin to maintain pressurization at high altitude, and aerodynamic smoothing of the aircraft's outer surfaces. The design criteria of modern aircraft require that sealants be fuel-resistant and light in weight while still maintaining the strength and toughness of traditional high-density sealants.

The compositions presently used for aerospace sealants are typically two-component compositions. The first component is a base component that generally contains a fuel and temperature resistant polymer, such as a polysulfide or polythioether polymer having thiol groups. The base component can also include fillers, pigments, plasticizers, adhesion promoters and other additives. The compositions also have a curative component that contains a curing agent, fillers, pigments, plasticizers and other additives. Useful curing agents are compounds capable of reacting with or oxidizing the thiol group such that the mixing of the first and second components produces, as an end product, a solid, rubber-like compound.

To reduce fuel consumption and increase payload capacity, aircraft manufacturers seek to reduce the use or weight of "fly-away" materials, which permanently reside in the aircraft structure. Because these include sealants, manufacturers have a strong incentive to use sealants with as low a density as possible without compromising performance. A commercially expedient method of reducing density is to incorporate lightweight fillers and pigments into the sealant composition. Fillers and pigments used for this purpose typically have voids or closed-cells enclosed within the particle or take the form of a closed bubble. These lightweight particles can be either rigid or elastomeric.

Known rigid hollow particles include Glass Microspheres available from 3M Company, St. Paul, Minn., and hollow glass microspheres sold under the trade designation ECCO-SPHERES from Trelleborg PPL, Retford, UK. Known elastomeric hollow particles include those sold under the trade designation EXPANCEL from AkzoNobel N.V., Amsterdam, Netherlands, and DUALITE from Henkel AG & Company, KGaA, Dusseldorf, Germany.

While rigid glass microspheres can be used in a variety of composite and honeycomb aerospace applications, aircraft manufacturers often prefer the more flexible sealants that contain elastomeric hollow particles for tight bond-line applications and areas such as fay joints, where crevice corrosion is a potential problem. Sealant manufacturers have responded by introducing low density sealants that incorporate elastomeric particles into the base component of the product.

Sealant compositions are also used outside of aerospace applications. For example, dual-component sealants are also found in the commercial transportation, automotive, and rail market industries. Further, these applications can be used by both original equipment manufacturers and providers for maintenance, repair and overhaul services within such industries.

SUMMARY

In consideration of the above, certain manufacturers have contemplated adding hollow elastomeric particles to the polymer base component of a sealant composition. Known compositions, however, fail to address the problem of filler compressibility at high pressures, and prior disclosures of such concepts do not contemplate adding such particles to the curative component of the product—see, for example, U.S. Pat. No. 7,262,245 (Bons et al.).

In certain applications, a problem arises when elastomeric particles are added to only one component. When packaging two-component aerospace sealants, the first and second components are commonly pumped under pressure either into a cartridge or into a dosing system to precisely control the ratio, and hence stoichiometry, of the two components. The viscosities of these sealant components tend to be high, commonly in the range of from 6,000 to 16,000 poise. As a result, pressures of several hundred to several thousand pounds per square inch can be required to pump them effectively. Because the elastomeric particles are compressible, the component that lacks elastomeric particles has a compressibility that is comparatively lower than its counterpart component. When pressure increases, the quantity of the unfilled component dispensed remains constant while that of the filled component varies, leading to stoichiometric variability and ultimately poorer product consistency.

The above can be problematic not only for the manufacturer but also the end user. In commercially available metering pumps, pressures can vary significantly during each stoke cycle. This variation in pressure in conjunction with a compressible sealant component creates variation in the ratio of base material dispensed per volume of curing agent that is likewise dispensed. This results in a variable mix ratio for the product and ultimately in variation in the product's performance.

In the provided compositions and methods, elastomeric particles are included in both the base component and the curative component of the sealant, enabling the compressibility of the base and curing agent components to be matched with each other. This matching of the compressibility results in a constant mix ratio despite variability in the applied pressure. This dramatically simplifies the packaging and use of light weight sealants and results in a more consistent performing product. Significantly, this principle can be more broadly applied to not only sealant applications, but two-part curable compositions containing compressible fillers in general.

In one aspect, a two-component composition is provided. The composition comprises: a base component comprised of a curable resin and a first compressible filler dispersed therein; and a curative component comprised of a curing agent and a second compressible filler dispersed therein, the base and curative components reactive with each other upon mixing to provide a crosslinked network.

In a second aspect, a reaction product of the aforementioned composition is provided.

In a third aspect, a method of sealing a surface is provided, comprising: metering into a vessel a base component comprising a curable resin and a first compressible filler; metering into the vessel a curative component comprised of a curing agent and a second compressible filler; mixing the base component with the curative component in the vessel to initiate curing of the curable resin; and dispensing the resulting mixture onto the surface to be sealed.

DEFINITIONS

As used herein:

"alkyl group" and the prefix "alk-" are inclusive of both straight chain and branched chain groups and of cyclic groups;

"alkylene" is the multivalent (e.g., divalent or trivalent) form of the "alkyl" groups defined above;

"ambient temperature" means at 25 degrees Centigrade;

"aryl" and "arylene" as used herein include carbocyclic aromatic rings or ring systems, for example, having 1, 2, or 3 rings and optionally containing at least one heteroatom (e.g., O, S, or N) in the ring;

"arylalkylene" refers to an "alkylene" moiety to which an aryl group is attached;

"alkylarylene" refers to an "arylene" moiety to which an alkyl group is attached;

"compressible" means able to significantly reduce in volume in response to an increase in pressure;

"curable resin" refers to a monomer or oligomer capable of being cured.

"cure" refers to the joining of polymer chains together by covalent chemical bonds using crosslinking molecules or groups to form a network polymer;

"curing agent" refers to a substance that causes or facilitates a curing reaction; and "nanoparticles" refer to particles having an median particle size of 500 nm or less.

DETAILED DESCRIPTION

The provided compositions are two-component curable compositions that generally include a base component and a curative component. In some embodiments, the curable composition includes only the base component and curative component. When the base component and curative component are mixed, they are capable of reacting with each other to form a crosslinked network. Particulars of each component are described in the sections below.

Base Components

The base component of the curable composition includes a curable resin and a compressible filler dispersed therein.

The base component can be present in any suitable proportion relative to the overall amount of the curable composition. In some embodiments, the base component may be at least 50 weight percent, at least 67 weight percent, at least 83 weight percent, at least 91 weight percent, or at least 95 weight percent, based on the overall weight of the curable composition. In some embodiments, the base component may be up to 95 weight percent, up to 91 weight percent, up to 83 weight percent, up to 67 weight percent, or up to 50 weight percent, based on the overall weight of the curable composition.

The amount of compressible filler in the base component need not be restricted. It is preferred, however, that the compressible filler is included in amounts sufficient to decrease the overall density of the cured composition without significantly degrading the handling properties or integrity of the sealant in its cured state.

The amount of the compressible filler in the base component can be at least 0.1 percent by weight, at least 0.12 percent by weight, at least 0.14 percent by weight, at least 0.16 percent by weight, at least 0.18 percent by weight, or at least 0.2 percent by weight, based on the overall weight of the base component. The amount of the compressible filler in the base component can be up to 5 percent by weight, up to 4 percent by weight, up to 3 percent by weight, up to 2 percent by weight, up to 1.5 percent by weight, or up to 1 percent by weight, based on the overall weight of the base component.

The amount of the compressible filler in the base component can be at least 4 percent by volume, at least 10 percent by volume, at least 15 percent by volume, at least 30 percent by volume, at least 45 percent by volume, or at least 60 percent by volume, based on the overall volume of the base component. The amount of the compressible filler in the base component can be up to 60 percent by volume, up to 45 percent by volume, up to 30 percent by volume, up to 15 percent by volume, up to 10 percent by volume, or up to 4 percent by volume, based on the overall volume of the base component.

As previously noted, compressible fillers are preferably present in both the base and curative components. Therefore, to avoid redundancy, particulars concerning the structure and composition of the compressible fillers shall be described later in its own section.

Useful curable resins are macromonomers, or oligomers, capable of chemically reacting to form part of a crosslinked network. The curable resin can be a polysulfide, polythioether, 1,3-diene, silicone, fluorocarbon, fluorosilicone, epoxy, maleimide, polycyanate ester, polyurethane precursor, or any mixture or copolymer thereof. Particular resins are described in more detail below.

Curable resins used in aerospace sealant applications can include polythioethers and polysulfides. Polythioethers include thioether linkages (i.e., —S—) in their backbone structures. Polysulfides include disulfide linkages (i.e., —S—S—) in their backbone structures.

Polythiols may contain an alkylene, arylene, alkylarylene, arylalkylene, or alkylenearylalkylene having more than one thiol group. Any of the alkylene, alkylarylene, arylalkylene, or alkylenearylalkylene can be optionally interrupted by one or more ether (i.e., —O—), thioether (i.e., —S—), or amine (i.e., —NR$_1$—) groups and optionally contain substituted alkoxy or hydroxyl groups. Useful monomeric polythiols may be dithiols or polythiols containing three thiol groups, four thiol groups, or more than four thiol groups.

In some embodiments, the polythiol is an alkylene dithiol. Exemplary dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedithiol, ethylcyclohexyldithiol (ECHDT), dimercaptodiethyl sulfide, methyl-substituted dimercaptodiethyl sulfide, dimethyl-substituted dimercaptodiethyl sulfide, dimercaptodioxaoctane, 1,5-dimercapto-3-oxapentane and mixtures thereof. Polythiols having more than two thiol groups include propane-1,2,3-trithiol; 1,2-bis[(2-mercaptoethyl)thio]-3-mercaptopropane; tetrakis(7-mercapto-2,5-dithiaheptyl)methane; and trithiocyanuric acid. Combinations of any of these or with any of the dithiols mentioned above are also possible.

Polythioethers can be prepared, for example, by reacting dithiols with dienes, diynes, divinyl ethers, diallyl ethers, ene-ynes, or combinations of these under free-radical conditions. Useful reagents for making polythioethers include any of the dithiols, dienes, diynes, divinyl ethers, diallyl ethers, and ene-ynes listed above. Examples of useful polythioethers are described, for example, in U.S. Pat. No. 4,366,307 (Singh et al.), U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), U.S. Pat. No. 6,172,179 (Zook et al.), and U.S. Pat. No. 6,509,418 (Zook et al.).

In some embodiments, the polythioether is represented by Formula I:

$$HS-R_3-[S-(CH_2)_2-O[-R_4-O-]_m-(CH_2)_2-S-R_3-]_n-SH \quad (I)$$

wherein each of $R_3$ and $R_4$ is independently a $C_{2-6}$ alkylene, which may be straight-chain or branched, $C_{6-8}$ cycloalkylene, $C_{6-10}$ alkylcycloalkylene, $-[(CH_2-)_p-X-]_q-(-CH_2-)_r$, in which at least one $-CH_2-$ is optionally substituted with a methyl group, X is one selected from the group consisting of O, S and $-NR_5-$, $R_5$ denotes hydrogen or methyl, m is a number from 0 to 10, n is a number from 1 to 60, p is a number from 2 to 6, q is a number from 1 to 5, and r is a number from 2 to 10.

Polythioethers with more than two thiol groups may be used. Any of the curing agents and methods described below in connection with at least partially curing the compositions disclosed herein may also be used for preparing the polythioethers. In some embodiments, a thermal free-radical initiator described below is combined with the dithiols and dienes, diynes, divinyl ethers, diallyl ethers, ene-ynes, or combinations of these, and the resulting mixture is heated to provide the polythioethers.

Polythioethers can be prepared, for example, by reacting dithiols with diepoxides, which may be carried out by stirring at room temperature, optionally in the presence of a tertiary amine catalyst (e.g., 1,4-diazabicyclo[2.2.2]octane (DABCO)). Useful dithiols include any of those described above. Useful epoxides can be any of those having two epoxide groups.

In some embodiments, the diepoxide is a bisphenol diglycidyl ether, in which the bisphenol (i.e., $-O-C_6H_5-CH_2-C_6H_5-O-$) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Polythioethers prepared from dithiols and diepoxides have pendent hydroxyl groups and can have structural repeating units represented by Formula II:

$$-S-R_3-S-CH_2-CH(OH)-CH_2-O-C_6H_5-CH_2-C_6H_5-O-CH_2-CH(OH)-CH_2-S-R_3-S- \quad (II)$$

wherein $R_3$ is as defined above, and the bisphenol unit (i.e., $-O-C_6H_5-CH_2-C_6H_5-O-$) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl.

Polysulfides can be prepared by the condensation of sodium polysulfide with bis-(2-chloroethyl) formal, which provides linear polysulfides having two terminal thiol groups. Branched polysulfides having three or more thiol groups can be prepared using trichloropropane in the reaction mixture. Examples of useful polysulfides are described, for example, in U.S. Pat. No. 2,466,963 (Ferguson et al); U.S. Pat. No. 2,789,958 (Fettes et al); U.S. Pat. No. 4,165,425 (Bertozzi); and U.S. Pat. No. 5,610,243 (Vietti et al.). Polysulfides are commercially available under the trademarks "THIOKOL" and "LP" from Toray Fine Chemicals Co., Ltd., Urayasu, Japan and are exemplified by grades "LP-2", "LP-2C" (branched), "LP-3", "LP-33", and "LP-541."

Polythioethers and polysulfides can have a variety of useful molecular weights. In some embodiments, the polythioethers and polysulfides have number average molecular weights of at least 500 g/mol, at least 750 g/mol, at least 1000 g/mol, at least 1500 g/mol, or at least 2000 g/mol. In some embodiments, the polythioethers and polysulfides have number average molecular weights of up to 20,000 g/mol, up to 15,000 g/mol, up to 10,000 g/mol, up to 7500 g/mol, or up to 5000 g/mol.

Other curable resins are also viable for use in the provided curable compositions. For example, polymers of 1,3-dienes may also be used. These include curable resins derived from isoprene and butadiene, along with their copolymers such as butadiene-acrylonitrile, butadiene-styrene, and isoprene isobutylene. The cured products of 1,3-dienes and their derivatives can be used in a wide range of commercially useful elastomeric materials.

The curable resin may also be based on a silicone resin. Silicone resins are characterized by their characteristic $-(Si-O)-$ repeat units, and may be cured to form elastomeric, crosslinked networks. The curing of oligomeric silicones can be carried out using any known method, including addition polymerization, condensation polymerization, peroxide polymerization, and oxime polymerization.

Addition polymerization can involve the reaction of a silicone hydride and a vinyl group. In this reaction, an ethyl group ($CH_2-CH_2$) is formed, without any byproducts. In this reaction, two separate components are generally mixed to catalyze the polymers: a base component containing a hydride- and a vinyl-functional siloxane polymer, and a curative component containing a platinum complex. When mixed, the hydride- and vinyl-functional siloxane polymers can react to create an ethyl bridge between them.

Condensation polymerization, commonly catalyzed by a suitable acid or base, can occur when one or more crosslinkers that hydrolyze and then progressively react with hydrolysable groups on the silicone resin or other crosslinkers to produce a crosslinked network. Crosslinkers include alkoxy, acetoxy or oxime silanes such as methyl trimethoxy silane for alkoxy-curing systems and methyl triacetoxysilane for acetoxy-curing systems. Optionally, an additional condensation catalyst is added to fully cure the silicone rubber system and achieve a tack-free surface. Organotitanate catalysts such as tetraalkoxy titanates or chelated titanates are used in alkoxy-cured systems. Tin catalysts such as dibutyl tin dilaurate (DBTDL) can be used in oxime and acetoxy-cured systems.

Alternatively, silicone resins containing vinyl groups can also be cured using a free radical polymerization route with the assistance of a curing agent, such as an organic peroxide. Typically, these curing reactions occur at elevated temperatures, and thus can be useful in extrusion or injection molding applications. Peroxides known for this purpose include dicumyl peroxide and dichlorobenzoyl peroxide.

The curable resin may also include any known fluoropolymer resin, such as a perfluoroelastomer. In some embodiments, the fluoropolymer resin is curable using a peroxide and coagent. In other embodiments, the fluoropolymer resin is cured by a catalyzed reaction of nitrile groups.

For example, the fluoropolymer can be a perfluoroelastomer containing nitrile groups. As disclosed for example in U.S. Pat. No. 5,527,861 (Logothetis), a perfluoroelastomer which contains a sufficient amount of nitrile groups can function as cure sites to crosslink the perfluoroelastomer. The nitrile groups can be introduced through the use of a nitrile containing cure site monomer, whereby the nitrile groups are introduced into the polymer during polymerization. Suitable polymers are described in, for example, U.S. Pat. No. 4,281,092 (Breazeale).

As another option, the curable resin can include one or more epoxy resins. Epoxy resins are known in the art and include compounds or mixtures of compounds that contain one or more epoxy groups. The compounds can be saturated or unsaturated, aliphatic, alicyclic, aromatic, or heterocyclic, or can comprise combinations thereof. In some embodiments, the curable resin includes a compound containing more than one epoxy group (e.g., a polyepoxide).

Polyepoxides can include aliphatic or aromatic polyepoxides. Aromatic polyepoxides can be used, for example, for high temperature applications. Aromatic polyepoxides are compounds containing at least one aromatic ring structure (e.g. a benzene ring) and more than one epoxy group, such as polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. An aromatic polyepoxide can be a polyglycidyl ether of a polyhydric phenol. Aromatic polyepoxides can include glycidyl esters of aromatic carboxylic acids, for example, phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, for example, N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, for example, 2,2-bis-[4-(2,3-epoxypropoxy)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and mixtures thereof. The polyglycidyl ethers of polyhydric phenols can be the diglycidyl ethers of bisphenol that have pendant carbocyclic groups, such as 2,2-bis[4-(2,3-epoxypropoxy)phenyl]norcamphane, 2,2-bis[4-(2,3-epoxypropoxy)phenyl]decahydro-1,4,5,8-dimethanonaphthalene, or 9,9-bis[4-(2,3-epoxypropoxy)phenyl]fluorene.

Aliphatic polyepoxides can include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, bis(3,4-epoxycyclohexylmethyl) adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

As another option, the curable resin may include one or more maleimide resins. Maleimide resins can include bismaleimides, polymaleimides, or polyaminobismaleimides, such as N,N'-bismaleimides. The N,N'-bismaleimide can be a N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with bismaleimides can include any of a wide variety of unsaturated organic compounds, such as those having multiple unsaturation (e.g., ethylenic, acetylenic, or both). Examples include acrylic acids and amides and the ester derivatives thereof, for example, acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate: triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene, dicyclopentadienyl acrylate; dicyclopentadienyloxyethyl acrylate; 1,4-butanediol divinyl ether: 1,4-dihydroxy-2-butene; styrene; α-methyl styrene; chlorostyrene; p-phenylstyrene; p-methylstyrene; t-butylstyrene; and phenyl vinyl ether. Resins including bismaleimide in combination with a bis(alkenylphenol) can be used, such as 4,4'-bismaleimidodiphenylmethane and o,o'-diallyl bisphenol A.

As another option, the curable resin may include one or more polycyanate ester resins. Exemplary polycyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from bisphenol A, bisphenol F, or bisphenol S. Tri- and higher functionality cyanate resins can be used. To improve flexibility of reaction products derived from polycyanate esters, these resins can be blended or copolymerized with other resins such as epoxy resins.

As yet another option, the curable resin may contain one or more polyurethane precursor resins. Polyurethane precursor resins include polyols, or long flexible polymeric segments that contain two or more hydroxyl groups per molecule. These polyols can be reacted with polyisocyanates, such as an aliphatic isocyanate or aromatic isocyanate, to form urethane linkages in a covalently-bonded polymeric network.

In some embodiments, the polyisocyanate component contains three or more isocyanate groups and thus enable crosslinking of the curable composition when reacted with a difunctional polyol (or diol). In some embodiments, the polyol component contains three or more hydroxyl groups to enable crosslinking of the curable composition when reacted with a difunctional polyisocyanate (or diisocyanate). It is also possible for both of the polyol and polyisocyanate components to have three or more of its respective functional groups above. For the purposes of this disclosure, either polyols or isocyanates could be broadly construed as curable resins suitable for use in the curable composition.

Useful polyols can have a number average molecular weight in the range of from 30 g/mol to 3000 g/mol. Optionally, a mixture of two or more polyols are used. An exemplary mixture can include one or more diols which serve as chain extenders, along with one or more triols and/or polyols having a functionality greater than 3, which serve as crosslinkers. Polyols that may be used in the curable resin can include polyesters, polycarbonates, polyacrylates, polyalkylenes, and polyethers, or combinations thereof.

Further aspects of polyurethane precursor resins are described in, for example, U.S. Pat. No. 5,082,147 (Jacobs) and U.S. Pat. No. 6,709,748 (Ho et al.).

Curative Components

The two-component compositions of the present disclosure further include a curative component. In preferred embodiments, the curative component can be homogeneously mixed with the base component to initiate a curing reaction at ambient temperatures. Optionally, the composition requires that these components are not only mixed together but also heated to elevated temperatures to facilitate the curing reaction. Such compositions are generally referred to as thermally curable.

The curative component can be present in any suitable proportion relative to the overall amount of the base component and curative component together. For instance, the curative component may be at least 5 weight percent, at least 9 weight percent, at least 17 weight percent, at least 33 weight percent, or at least 50 weight percent, based on the overall weight of the base component and curative component together. In the same or alternative embodiments, the curative component may be up to 50 weight percent, up to 33 weight percent, up to 17 weight percent, up to 9 weight percent, or up to 5 weight percent, based on the overall weight of the base component and curative component together.

The amounts above can correspond to any suitable mix ratio between the base component and the curative component. For example, it can be convenient for the two components to be provided in approximately equal volumes to facilitate mixing. Alternatively, the base component and curative component could be mixed in a highly skewed mix ratio 15:1 by weight. While not critical, base component and curative component are present in a mix ratio of up to 15:1, up to 10:1, up to 5:1, up to 4:1, up to 3:1, up to 2:1, or up to 1:1 by weight.

The curative component includes at least one curing agent and a compressible filler. The compressible filler can be intimately mixed with, or otherwise pre-dispersed within, the curing agent. The compressible filler may be the same as, or different from, the compressible filler present in the base component. For clarity, details concerning the structure and composition of the compressible fillers are more fully described in the next section.

The amount of compressible filler in the curative component need not be particularly restricted. Preferably, the compressible filler is included in an amount sufficient to decrease the overall density of the cured composition without significantly degrading the handling properties or integrity of the sealant in its cured state.

Optionally, the filler loading can be matched with that of the base component to avoid inhomogeneity in filler concentration when the two components are mixed. Alternatively, the filler loading in the curative component could be adjusted to obtain particular rheology or handling characteristics. In any case, the filler loading of the curative component could be significantly greater than or less than that of the base component.

In some embodiments, the amount of the compressible filler in the curative component is at least 0.1 percent by weight, at least 0.12 percent by weight, at least 0.14 percent by weight, at least 0.16 percent by weight, at least 0.18 percent by weight, or at least 0.2 percent by weight, based on the overall weight of the curative component. In some embodiments, the amount of the compressible filler in the curative component is up to 5 percent by weight, up to 4 percent by weight, up to 3 percent by weight, up to 2 percent by weight, up to 1.5 percent by weight, or up to 1 percent by weight, based on the overall weight of the curative component.

The amount of the compressible filler in the curative component can be at least 4 percent by volume, at least 10 percent by volume, at least 15 percent by volume, at least 30 percent by volume, at least 45 percent by volume, or at least 60 percent by volume, based on the overall volume of the curative component. The amount of the compressible filler in the curative component can be up to 60 percent by volume, up to 45 percent by volume, up to 30 percent by volume, up to 15 percent by volume, up to 10 percent by volume, or up to 4 percent by volume, based on the overall volume of the curative component.

Any curing agents known in the art may be used in the curative component for the particular curable resin or resins present in the curable composition. In some embodiments, the curing agent includes one or more peroxides, some of which have been mentioned in the previous section. Peroxide crosslinking is especially useful for certain curable resins, such as polysulfides, polyethylene and other polyolefins, and polysiloxanes. Advantageously, the curing of these curable resins increases their strength properties and extends the upper temperature limit at which the cured composition can be used. Generally, peroxide crosslinking involves the formation of polymer radicals by hydrogen abstraction by peroxy radicals, which are in turn borne from the decomposition of the peroxide.

For polysulfide compositions, curing can be achieved though the addition of a strong oxidizing agent. Oxidizing agents such as lead dioxide, manganese dioxide, calcium dichromate, and ammonium dichromate are commonly used. The technique in which they are compounded into the sealant formulation and other factors such as pH, particle size of the oxidizing agent, the presence or absence of accelerating or retarding chemicals, relative humidity, and temperature can affect the rate and extent of cure, and hence the useful properties of the sealant in the field—see, for example, U.S. Pat. No. 4,020,033 (Dannels).

In the crosslinking of polysulfide rubbers, the curing agent can include other organic oxidants. Exemplary oxidants can include, for example, zinc oxide, para-quinone dioxime, and mixtures of altax and diphenylguanadine activators. These can oxidize terminal thiol groups to lengthen the polymer backbone while other thiol groups enable crosslinking between polymers through oxidation polycondensation. See, e.g., VISAHK ET AL., ADVANCES IN ELASTOMERS I: BLENDS AND INTERPENETRATING NETWORKS, (2013).

For polysiloxane compositions, small amounts of vinyl groups can be incorporated into a polydimethylsiloxane or polyphenylmethylsiloxane structure to increase crosslinking efficiency. In some embodiments, this is accomplished through copolymerization of the siloxane with a small amount of vinylmethylsilanol.

For curable resins containing 1,3-dienes, the curing agent can comprise sulfur or a sulfur compound. Sulfur crosslinking, also known as sulfur vulcanization, can be used to cure two-component compositions based on conjugated dienes. 1,3-dienes that can be crosslinked using this method include, as mentioned previously, isoprene and butadiene, along with their copolymers such as butadiene-acrylonitrile, butadiene-styrene, and isoprene isobutylene. The curing process is believed to proceed by an ionic route, in which a sulfonium ion (—S$^+$—) is initially formed and reacts with the polymer chain by hydride abstraction. The polymeric cation then undergoes crosslinking by reacting first with sulfur and then by addition to a double bond in the polymer. See, e.g., ODIAN, PRINCIPLES OF POLYMERIZATION, $2^{ND}$ ED. (1981).

In regards to sulfur crosslinking, accelerators can be added to enhance the rate and efficiency of the curing reaction. These accelerators can include, for example, organo-sulfur compounds like tetra-alkylthiuram disulfide, zinc dialkyldithiocarbamate, 2,2'-dithiobis-benzothiazole, and related compounds. Such accelerators could also include non-sulfur compounds such as aryl guanidines. Efficiency can be further enhanced by using an accelerator in combination with an activator, which is typically a metal oxide and a fatty acid that helps solubilize the metal oxide. For instance, zinc oxide and stearic acid could function together as an activator.

For polyolefin-based (e.g. ethylene-propylene) compositions, crosslinking can be modified by synthesizing terpolymers containing small amounts of an unconjugated diene such as dicyclopentadiene. Since these polymers have pendant unsaturated groups, they can also be crosslinked by an accelerated sulfur process, as described above.

For curable resins that contain epoxy groups, curing agents can include an anhydride such as a substituted or unsubstituted phthalic anhydride, a hydrogenated derivative of a substituted or unsubstituted phthalic anhydride, or chlorendic anhydride; an amine curing agent such as ethylenediamine, diethylenetriamine, aminoethylethanolamine, and the like, diaminodiphenylsulfone, 9,9-bis(4-aminophenyl)fluorene, 9,9-bis(3-chloro-4-(aminophenyl)fluorine, an amide curing agent such as dicyandiamide, a polycarboxylic acid such as adipic acid, a polyphenol such as bisphenol A, or a combination thereof. At least some of these curing agents could also be used with modified polycyanate ester resins that contain epoxide functional groups.

Maleimide resins may be modified or copolymerized with epoxy resins using a curing agent such as described above. Alternatively, these resins could be pre-blended with a phenolic resin and polymerized using a curing agent based on the combined use of the basic catalyst and the peroxide as the curing catalyst, where the peroxide acts as a radical polymerization initiator and the basic catalyst promotes additional reaction of the phenolic resin being a curing agent to the maleimide resin. See, e.g., U.S. Pat. No. 5,272,377 (Shimozawa et al.).

Curing agents useful for polyurethane precursor resins include any of a number of known urethane catalysts. Examples include catalysts based on aluminum, bismuth, tin, vanadium, zinc, or zirconium, which can be mixed in with the curable resin of the base component. Particularly useful catalysts include, for example, dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. Other catalysts include tertiary amines, tin mercaptides, and stannous salts of carboxylic acids, such as stannous octoate, stannous oleate, stannous acetate, and stannous laurate.

Any of the aforementioned curing agents could be prepared using conventional synthetic methods known in the art.

Fillers

Curable compositions can include any of a number of suitable, lightweight fillers. The addition of such fillers to the composition can significantly reduce the density of the cured sealant and improve fuel economy in aerospace applications. Such fillers are potentially very broad in scope and can serve any of a number of different functions. Notably, these fillers include both compressible and incompressible (i.e., rigid) fillers.

In the provided compositions, the base component and the curative component each contain one or more compressible fillers. In some embodiments, the base component and curative component contain the same compressible filler(s). Alternatively, the base component and curative component may contain compressible fillers that are different from each other in chemical composition and/or structure.

Exemplary lightweight fillers can have voids or closed-cells enclosed within the particle or take the form of a hollow particles. Exemplary compressible fillers include lightweight polymeric fillers made from polyamide, polyethylene, polypropylene, acrylonitrile copolymer, methacrylonitrile copolymer, polysulfide, or a combination thereof. In some embodiments, the compressible fillers are pigmented to provide color to the curable composition.

Commerically available compressible fillers include elastomeric hollow particles such as EXPANCEL brand microspheres from AkzoNobel N.V., Amsterdam, Netherlands, or DUALITE brand heat-expandable polymeric microspheres from Henkel AG & Company, KGaA. If desired, a mixture of two or more different compressible fillers, differing in particle size, shape, and/or composition, can be used in either or both of the base and curative components.

The median particle size of the compressible filler may be at least 0.5 micrometers, at least 0.75 micrometers, at least 1 micrometer, at least 1.2 micrometers, or at least 1.5 micrometers. In some embodiments, the median particle size of the compressible filler may be up to 40 micrometers, up to 35 micrometers, up to 30 micrometers, up to 25 micrometers, or up to 20 micrometers.

In some embodiments, the compressible filler is surface-modified. Such surface modification can be carried out by corona treatment or by another activating treatment such as treatment of the filler surface with a silane. Surface modification can achieve an improved bonding of the polymeric powder into the composition and thus improved mechanical properties. Functional groups which facilitate bonding into the base polymer, such as e.g. polysulfide, should thus be made available on the surface of the powder particles.

Although not required, the compressible filler(s) in either or both of the base and curative components of the composition may be accompanied by one or more rigid, incompressible fillers.

Examples of rigid fillers include rigid hollow particles such as 3M Glass Microspheres from 3M Company and ECCOSPHERES brand hollow glass microspheres from Trelleborg AB, Trelleborg, Sweden. Like the compressible fillers described previously, these rigid hollow fillers can significantly reduce the density of a composition while preserving acceptable mechanical properties after curing.

Advantageously, the inclusion of hollow filler particles can significantly reduce the density of the composition and hence the overall weight of the composition in practice. To maximize the density reduction, it is preferred for the density of the filler particles themselves to be as low as possible. In preferable embodiments, these fillers have a true density of at least 0.18, at least 0.3, at least 0.5, at least 0.6, or at least 0.8 g/cm$^3$. Preferably, these fillers have a true density of up to 0.18, up to 0.3, up to 0.5, up to 0.6, or up to 0.8 g/cm$^3$.

As a further option, the base component may further comprise one or more solid (non-hollow) inorganic fillers. The type of inorganic filler is not especially restricted and could include, for example, fumed silica or calcium carbonate. Useful fillers also include chopped fibers, such as chopped carbon or graphite fibers, glass fibers, boron fibers, silicon carbide fibers, and combinations thereof. Inorganic nanoparticles may also be used. If present, the inorganic nanoparticles may be surface-modified to improve compatibility with the curable resin.

Inorganic nanoparticles can be composed of any suitable material, such as silica, titania, alumina, zirconia, vanadia, chromia, iron oxide, antimony oxide, tin oxide, or a combination thereof. The nanoparticles can be silica nanoparticles, and in some embodiments can be substantially free of materials other than silica. In some embodiments, the resin component can be formed by combining the curable resin with a sol including the nanoparticles and a solvent, followed by evaporation of the solvent.

In an exemplary embodiment, silica nanoparticles are incorporated into the base component in the form of a curable resin sol comprising a colloidal dispersion of substantially spherical surface-modified silica. The curable sol could be dispersed, for example, into an epoxy resin, followed by a solvent stripping process under heat and vacuum. Options and advantages associated with such silica fillers are described, for example, in U.S. Pat. No. 5,648,407 (Goetz et al.).

Silica nanoparticle filler can be present in an amount of at least 0.1 percent, based on the total weight of the base or curative component. The silica filler can be present in an amount of up to 10 percent, up to 9 percent, up to 8 percent, up to 7 percent, or up to 6 percent, based on the total weight of the base or curative component.

Useful calcium carbonate fillers include nanocalcite fillers, which can be surface-modified and dispersed in a curable resin of the base component of the two-part composition. The nanocalcite filler can be comprised of a surface-modifying agent, or ligand, ionically bonded to a calcite core, where at least 70% of the calcite cores have a median particle size of from 10 nm to 400 nm.

In some embodiments, the ligand contains a binding group ionically bonded to the calcite and a compatibilizing segment that is compatible with the curable resin. In some embodiments, the binding group comprises a phosphonic acid, a sulfonic acid, or a combination thereof. The compatibilizing group can include a polyether such as polyethylene oxide or polypropylene oxide. Optionally, the ligand includes a reactive group capable of reacting with the curable resin. In some embodiments, the ligand is a zwitterion. In some embodiments, the ligand comprises a polyetheramine.

Calcium carbonate filler can be present in an amount of at least 2 percent, at least 3 percent, at least 4 percent, at least 5 percent, or at least 6 percent based on the total weight of the base or curative component. The calcium carbonate filler can be present in an amount of up to 45 percent, up to 40 percent, up to 35 percent, up to 32 percent, or up to 30 percent, based on the total weight of the base or curative component.

Further aspects of surface-modified nanocalcite filler are described in U.S. Pat. No. 9,221,970 (Schultz et al.).

Optional Additives

The curable composition could incorporate additional additives. In preferred embodiments, these additives are incompressible or have negligible compressibility. Optional additives include pigments, which could be included in one or both of the base component and curative component of the overall composition. Pigments can include titanium dioxide, zinc sulfide, carbon black, and other various organic and inorganic substances known in the art.

A plasticizer may also be added to one or both of the base and curative components. Advantageously, plasticizers can improve the texture and handling properties of the composition prior to curing. Known plasticizers include aliphatic oils, waxes, fatty acid salts, and resins derived from alkylated phenols and esters. Combinations of the above may also be used.

The amount of plasticizer present is not critical and can depend, for example, on the molecular weight of the curable resin or resins, and the desired properties of the cured composition. Generally, the plasticizer is present in an amount of at least 1, 2, 5, 10, or 15 weight percent based on the overall weight of the component in which it is blended. The plasticizer can be present in an amount of up to 20, 25, 30, 25, or 40 weight percent based on the overall weight of the component in which it is blended.

Other optional additives not already mentioned can also include additional cure accelerators, catalysts, crosslinking agents, dyes, flame retardants, impact modifiers (e.g., rubbers or thermoplastics), and flow control agents.

Methods of Use

Figure 1:
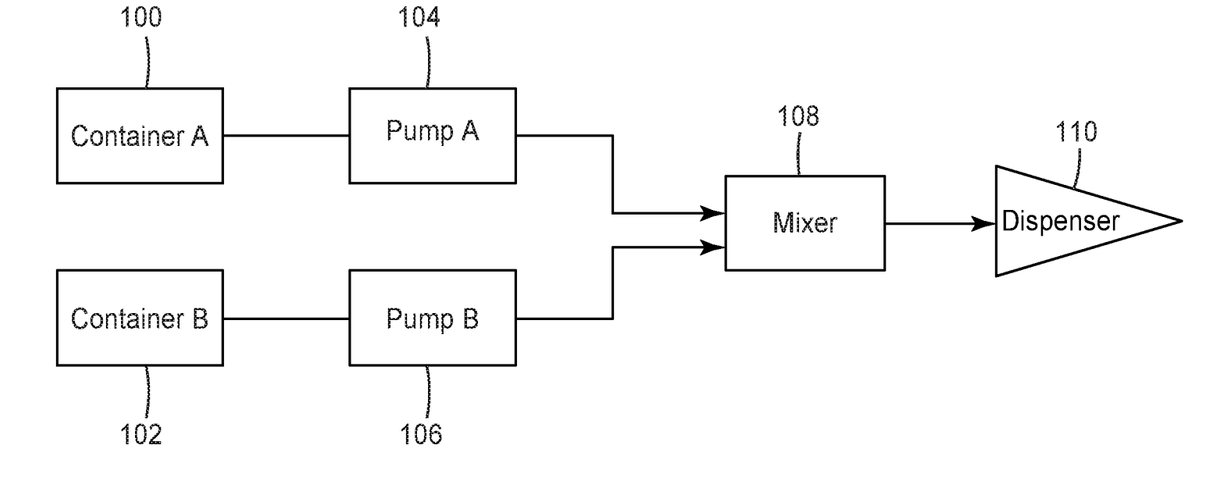
FIG. 1 is a block diagram showing the mixing and dispensing of a curable composition according to the present disclosure.

An exemplary method of using the provided compositions is schematically shown in the block diagram of FIG. 1. Parts A and B of the composition are stored in a first container 100 and a second container 102. In this schematic representation, Part A represents the base component containing the curable resin and the first compressible filler, while Part B represents the curative component containing the curing agent and the second compressible filler. Preferably Parts A and B are macroscopically homogenous liquids at ambient temperatures.

At such time that the composition is to be dispensed, Parts A and B of the composition are pumped from their respective containers 100, 102 (Containers A and B) by metering pumps 104, 106 (Pumps A and B). The metering pumps 104, 106 have a configuration to convey fixed, stoichiometric amounts of Parts A and B as a function of time. The metering pumps 104, 106 are disposed downstream from the containers 100, 102 and convey Part A and Part B into a common vessel, such as a mixer 108 as shown. The type of pump used for the metering pumps 104, 106 is not especially restricted, but it is common for a positive displacement pump to be used in aerospace sealant applications.

In the mixer 108, the two components are mixed together to initiate curing of the curable resin, along with any reactive additives. Any suitable mixer can be used. The mixer 108 can be, for example, a static mixer, dynamic mixer, or impingement mixer. The mixture is then directed through a dispenser 110, where it can then be applied to a surface, or two adjoining surfaces, to be sealed.

While it is common for the mixed composition to be applied as a bead from a handheld dispenser, the mixed composition may be shaped according to any of a number of known methods, such as by a molding, film coating, or pultrusion process.

By using the provided two-component compositions, which have a controlled quantity of elastomeric particles in both the base and curative components, the compressibility of these components can be matched with each other. This matching compressibility results in a constant mix ratio regardless of the pressure applied by the metering pumps 104, 106. Advantageously, this simplifies the packaging and use of light weight sealants and results in a product having a more consistent performance.

The compressibility of the base and curative components can be significant. As a result, the volume occupied by these components varies with pressure. Since the pressure applied by a metering pump varies as a function of time (generally sinusoidally), the weight and volume of each component dispensed similarly varies as a function of time. Useful handling properties were observed when each of the base and curative components are formulated to have a viscosity in the range of 6000 poise to 16,000 poise.

In some embodiments, one or both of the base component and curative component display an average compression of at least 4 percent, at least 5 percent, at least 6 percent, at least 7 percent, or at least 8 percent, when subjected to a pressure of 5 Bar at ambient temperature. In some embodiments, one or both of the base component and curative component display an average compression of up to 50 percent, up to 49 percent, up to 48 percent, up to 47 percent, or up to 45 percent, when subjected to a pressure of 5 Bar at ambient temperature.

To mitigate variation in the actual mix ratio obtained when metering the base and curative components, it is preferable to select filler loadings of these whereby the base component displays an average compression within 15 percent, within 12 percent, within 10 percent, within 7 percent, within 5 percent, within 4 percent, within 3 percent, within 2 percent, or within 1 percent that of the curative component, when both are subjected to a common pressure of 5 Bar at ambient temperature. Ideally, the compressibility of the base component and the compressibility of the curative component substantially match each other such that each component is metered at a consistent stoichiometric ratio over time.

The inclusion of low-density fillers to the base and curative component can provide significant reductions in the overall density while achieving equivalent or even better sealant performance properties. The curable compositions can provide a reaction product with a density of up to 1.7 g/milliliter, up to 1.5 g/milliliter, or up to 1.35 g/milliliter.

While not intended to be exhaustive, further exemplary embodiments are provided hereunder:

1. A two-component curable composition comprising: a base component comprised of a curable resin and a first compressible filler dispersed therein; and a curative component comprised of a curing agent and a second compressible filler dispersed therein, the base and curative components reactive with each other upon mixing to provide a crosslinked network.
2. The composition of embodiment 1, wherein the first and second compressible fillers each comprises hollow particles.
3. The composition of embodiment 2, wherein the hollow particles comprise elastomeric hollow particles.
4. The composition of any one of embodiments 1-3, wherein the first compressible filler is present in an amount of from 0.9 percent to 28 percent by weight based on the overall weight of the base component.
5. The composition of embodiment 4, wherein the first compressible filler is present in an amount of from 2 percent to 15 percent by weight based on the overall weight of the base component.
6. The composition of embodiment 5, wherein the first compressible filler is present in an amount of from 2 percent to 13 percent by weight based on the overall weight of the base component.
7. The composition of any one of embodiments 1-6, wherein the second compressible filler is present in an amount of from 1 percent to 38 percent by weight based on the overall weight of the curative component.
8. The composition of embodiment 7, wherein the second compressible filler is present in an amount of from 2.5 percent to 20 percent by weight based on the overall weight of the curative component.
9. The composition of embodiment 8, wherein the second compressible filler is present in an amount of from 2.5 percent to 16 percent by weight based on the overall weight of the curative component.
10. The composition of any one of embodiments 1-9, wherein each of the base component and curative component displays an average compression of from 5 percent to 50 percent when subjected to a pressure of 5 Bar at ambient temperature.
11. The composition of embodiment 10, wherein each of the base component and curative component displays an average compression of from 8 percent to 48 percent when subjected to a pressure of 5 Bar at ambient temperature.
12. The composition of embodiment 11, wherein each of the base component and curative component displays an average compression of from 8 percent to 45 percent when subjected to a pressure of 5 Bar at ambient temperature.
13. The composition of any one of embodiments 1-12, wherein the base component displays an average compression within 15 percent of that of the curative component when both are subjected to a pressure of 5 Bar at ambient temperature.
14. The composition of embodiment 13, wherein the base component displays an average compression within 10 percent of that of the curative component when both are subjected to a pressure of 5 Bar at ambient temperature.
15. The composition of embodiment 14, wherein the base component displays an average compression within 5 percent of that of the curative component when both are subjected to a pressure of 5 Bar at ambient temperature.
16. The composition of any one of embodiments 1-15, wherein each of the first and second compressible fillers comprises an acrylonitrile copolymer, methacrylonitrile copolymer, or polysulfide.
17. The composition of any one of embodiments 1-16, wherein the curable resin comprises a polysulfide, polythioether, 1,3-diene, silicone, fluorocarbon, fluorosilicone, epoxy, maleimide, polycyanate ester, polyurethane precursor, or mixture or copolymer thereof.
18. The composition of embodiment 17, wherein the curable resin comprises a polysulfide.
19. The composition of embodiment 17, wherein the curable resin comprises a polythioether.
20. The composition of embodiment 18 or 19, wherein the curative component comprises one or more of lead dioxide, manganese dioxide, calcium dichromate, and ammonium dichromate.
21. The composition of any one of embodiments 1-20, wherein the composition, after mixing, has a density of up to 1.7 g/milliliter.
22. The composition of embodiment 21, wherein the composition, after mixing, has a density of up to 1.5 g/milliliter.
23. The composition of embodiment 22, wherein the composition, after mixing, has a density of up to 1.35 g/milliliter.

24. The composition of any one of embodiments 1-23, wherein each of the base component and the curative component has a viscosity of from 6000 poise to 16,000 poise.

25. The composition of any one of embodiments 1-24, wherein the base component further comprises a silica filler.

26. The composition of embodiment 25, wherein the silica filler is surface-modified.

27. The composition of embodiment 25 or 26, wherein the silica filler is present in an amount of from 0.1 percent to 10 percent, based on the total weight of the base component.

28. The composition of embodiment 27, wherein the silica filler is present in an amount of from 0.1 percent to 8 percent, based on the total weight of the base component.

29. The composition of embodiment 28, wherein the silica filler is present in an amount of from 0.1 percent to 7 percent, based on the total weight of the base component.

30. The composition of any one of embodiments 1-29, wherein the base component further comprises calcium carbonate filler having a mean particle size of from 50 to 200 nanometers.

31. The composition of embodiment 30, wherein the calcium carbonate filler is present in an amount of from 2 percent to 40 percent, based on the total weight of the base component.

32. The composition of embodiment 31, wherein the calcium carbonate filler is present in an amount of from 5 percent to 35 percent, based on the total weight of the base component.

33. The composition of embodiment 32, wherein the calcium carbonate filler is present in an amount of from 5 percent to 30 percent, based on the total weight of the base component.

34. The composition of any one of embodiments 1-33, wherein the base component and curative component are present in a mix ratio of from 15:1 to 1:1 by weight.

35. The composition of embodiment 34, wherein the base component and curative component are present in a mix ratio of from 15:1 to 2:1 by weight.

36. The composition of embodiment 35, wherein the base component and curative component are present in a mix ratio of from 15:1 to 4:1 by weight.

37. The composition of any one of the embodiments 1-36, wherein the composition is an aerospace sealant composition.

38. A reaction product of the composition of any one of embodiments 1-37.

39. A method of sealing a surface comprising: metering into a vessel a base component comprising a curable resin and a first compressible filler; metering into the vessel a curative component comprised of a curing agent and a second compressible filler; mixing the base component with the curative component in the vessel to initiate curing of the curable resin; and dispensing the resulting mixture onto the surface to be sealed.

40. The method of embodiment 39, wherein the base component and curative component display respective average compression values substantially matching each other when subjected to a pressure of 5 Bar at ambient temperature whereby each component is metered at a consistent stoichiometric ratio over time.

41. The method of embodiment 39 or 40, wherein metering the base component and curative component comprises pumping each through a respective metering pump whose applied pressure varies sinusoidally with time.

EXAMPLES

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all reagents were obtained or are available from Sigma-Aldrich Company, St. Louis, Mo., or may be synthesized by known methods. Unless otherwise reported, all ratios are by weight percent.

The following abbreviations are used to describe the materials and examples:

atm: atmosphere
° C.: degrees Centigrade
$g/cm^2$: grams per cubic centimetre
kPa: kiloPascal
vol. %: volume percent
wt. %: weight percent
EM: Elastomeric microspheres, obtained under the trade designation "EXPANCEL 920DE 40 D30" from Akzo Nobel, N.V., Amsterdam, Netherlands.
G-1: A liquid polysulfide resin, mol. wt. 3,700, obtained under the trade designation "THIOPLAST G1" from Akzo Nobel Functional Chemicals GmbH, Greiz, Germany.
G-12: A liquid polysulfide resin, mol. wt. 4,000, obtained under the trade designation "THIOPLAST G12" from Akzo Nobel Functional Chemicals GmbH.
G-44: A liquid polysulfide resin, mol. wt. 1,000, obtained under the trade designation "THIOPLAST G44" from Akzo Nobel Functional Chemicals GmbH.
HB-40: A partially hydrogenated terphenyl plasticizer, obtained under the trade designation "HB-40" from Univar USA, Inc., Downers Grove, Ill.
$MnO_2$: Manganese dioxide, activated Type II, obtained from Shepard Color Company, Cincinnati, Ohio.
R-202: A surface modified fumed silica, obtained under the trade designation "AEROSIL R202" from Evonik Industries, AG, Essen, Germany.
RE-610: A polyoxyethylene nonylphenyl ether surfactant, obtained under the trade designation "RHODAFAC RE-610" from Solvay Chemicals, Inc., Houston, Tex.
S-302: Nanoparticle calcium carbonate, obtained under the trade designation "SOCAL 302" from Solvay Chemicals, Inc.

Base Component

BC-1

A polysulfide sealant base component was prepared by adding 100 parts by weight of a 1:1:1 blend of G-1, G-12 and G-44 to a glass kettle. 40 parts S-302 was then homogeneously dispersed in the polymer blend by means of the high shear mixer for 5 minutes at 21° C. 1.5 parts R-202 was then added and high speed mixing continued until homogeneously dispersed, approximately 5 minutes. The resulting density of the base component was 1.51 $g/cm^2$, and the quantity of compressible particles was 0 vol. %.

BC-2

The procedure generally described for preparing BC-1 was repeated, wherein 4.7 parts EM was added along with the S-302. The resulting density of the base component was 1.25 $g/cm^2$, and the quantity of compressible particles was 20 vol. %.

BC-3

The procedure generally described for preparing BC-2 was repeated, wherein the EM was increased to 12.5 parts by weight. The density of the base component was 0.99 $g/cm^2$, and the quantity of compressible particles was 40 vol. %.

A summary of the Base Components, specifying wt. % compressible filler, density and volume per 100 grams dispensed at 1 and 5 atmospheres set pressure (101.3 and 506.5 kPa, respectively), is provided in Table 1.

Curing Components

CC-1

94 parts by weight of the plasticizer HB-40 and 1.3 parts surfactant RE-610 were mixed together in a glass pot at 21° C. 100 parts MnO₂ and 4 parts water incrementally added to the mixture over 10 minutes until wetted out, then fully dispersed for an additional 10 minutes by means of a high shear mixer. The density of the curing component was 1.62 g/cm², and the quantity of compressible particles was 0 vol. %.

CC-2

The procedure generally described for preparing CC-1 was repeated, wherein 6.17 parts EM and 4 parts deionized water were added after the MnO₂ had been wetted out. High speed mixing was continued until the elastomeric particles were homogeneously dispersed, approximately 5 minutes. The density of the curing component was 1.33 g/cm², and the quantity of compressible particles was 20 vol. %.

CC-3

The procedure generally described for preparing CC-2 was repeated, wherein the EM was increased to 16.5 parts by weight. The density of the curing component was 1.05 g/cm², and the quantity of compressible particles was 40 vol. %.

A summary of the Curing Components, specifying wt. % compressible filler, density and volume per 100 grams dispensed at 1 and 5 atmospheres set pressure (101.3 and 506.5 kPa, respectively), is provided in Table 2.

Mixing System

The polysulfide base and curative components were mixed to homogeneity using a fixed volume meter mixing machine, a Metermaster Model 523-456 fitted with two Model 250H pail pumps (all available from H&G Industries International Inc., Carson City, Nev.) and a static mixer consisting of three TAH Industries Model 100 (Part number 102-812, obtained from Nordson EFD Corporation, Westlake, Ohio) tubes connected in series. Pumping and mixing pressures were set to 5 atmospheres (506.5 kPa), though actual observed pressures varied between 2 and 5 atmospheres during dispensing.

In the Tables 3 and 4, sealant compositions have a mix ratio of 100 grams of base component to 10 grams of curing component. Comparatives are listed in Table 3, while Examples of the present invention are listed in Table 4.

TABLE 1

| Base Component | Compressible Filler (wt. %) | Density (g/cm²) | Volume of 100 grams (cm²) | |
|---|---|---|---|---|
| | | | Set Pressure 1 atm (101.3 kPa) | Set Pressure 5 atm (506.5 kPa) |
| BC-1 | 0 | 1.51 | 66.23 | 66.23 |
| BC-2 | 20 | 1.25 | 80.00 | 67.2 |
| BC-3 | 40 | 0.99 | 101.01 | 68.69 |

TABLE 2

| Curative Component | Compressible Filler (wt. %) | Density (g/cm²) | Volume of 100 grams (cm²) | |
|---|---|---|---|---|
| | | | Set Pressure 1 atm (101.3 kPa) | Set Pressure 5 atm (506.5 kPa) |
| CC-1 | 0 | 1.62 | 6.17 | 6.17 |
| CC-2 | 20 | 1.33 | 7.52 | 6.32 |
| CC-3 | 40 | 1.05 | 9.52 | 6.47 |

TABLE 3

| Sample | Base Component | Curative Component | Volume mix ratio | |
|---|---|---|---|---|
| | | | Set Pressure 1 atm (101.3 kPa) | Set Pressure 5 atm (506.5 kPa) |
| Comparative A | BC-2 | CC-1 | 12.97 | 10.89 |
| Comparative B | BC-3 | CC-1 | 16.37 | 11.17 |
| Comparative C | BC-1 | CC-2 | 8.81 | 10.48 |
| Comparative D | BC-1 | CC-3 | 6.96 | 10.24 |

TABLE 4

| Sample | Base Component | Curative Component | Volume mix ratio | |
|---|---|---|---|---|
| | | | Set Pressure 1 atm (101.3 kPa) | Set Pressure 5 atm (506.5 kPa) |
| Example 1 | BC-1 | CC-1 | 10.73 | 10.73 |
| Example 2 | BC-2 | CC-2 | 10.64 | 10.63 |
| Example 3 | BC-3 | CC-3 | 10.61 | 10.62 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A two-component curable composition comprising:
    a base component comprised of a curable resin and a first compressible filler dispersed therein; and
    a curative component comprised of a curing agent and a second compressible filler dispersed therein, the base and curative components reactive with each other upon mixing to provide a crosslinked network, wherein the base component and curative component display respective average compression values within 15 percent of each other when subjected to a pressure of 5 Bar at ambient temperature,
    wherein the first and second compressible fillers each comprises elastomeric hollow particles or lightweight polymeric fillers made from an acrylonitrile copolymer, methacrylonitrile copolymer, or polysulfide, and
    wherein the base component and curative component are present in a mix ratio of from 15:1 to 1:1 by weight.
2. The composition of claim 1, wherein the first and second compressible fillers each comprises elastomeric hollow particles.

3. The composition of claim 1, wherein the first compressible filler is present in an amount of from 0.9 percent to 28 percent by weight based on the overall weight of the base component.

4. The composition of claim 1, wherein the second compressible filler is present in an amount of from 1 percent to 38 percent by weight based on the overall weight of the curative component.

5. The composition of claim 1, wherein each of the first and second compressible fillers comprises lightweight polymer fillers made from an acrylonitrile copolymer, methacrylonitrile copolymer, or polysulfide.

6. The composition of claim 1, wherein the curable resin comprises a polysulfide or polythioether.

7. The composition of claim 1, wherein the base component further comprises a surface-modified silica filler.

8. The composition of claim 1, wherein the base component further comprises calcium carbonate filler having a mean particle size of from 50 to 200 nanometers.

9. A reaction product of the composition of claim 1.

10. A method of sealing a surface comprising:
   metering into a vessel a base component comprising a curable resin and a first compressible filler;
   metering into the vessel a curative component comprised of a curing agent and a second compressible filler;
   mixing the base component with the curative component in the vessel to initiate curing of the curable resin; and
   dispensing the resulting mixture onto the surface to be sealed,
   wherein the first and second compressible fillers each comprises elastomeric hollow particle or lightweight polymeric fillers made from an acrylonitrile copolymer, methacrylonitrile copolymer, or polysulfide,
   wherein the base component and curative component display respective average compression values within 15 percent of each other when subjected to a pressure of 5 Bar at ambient temperature, and
   wherein the base component and curative component are present in a mix ratio of from 15:1 to 1:1 by weight.

11. The method of claim 10, wherein metering the base component and curative component comprises pumping each through a respective metering pump whose applied pressure varies sinusoidally with time.

* * * * *

UNITED STATES PATENT AND TRADEMARK OFFICE
CERTIFICATE OF CORRECTION

PATENT NO. : 10,815,408 B2  
APPLICATION NO. : 16/336169  
DATED : October 27, 2020  
INVENTOR(S) : Jon Zook et al.

Page 1 of 1

It is certified that error appears in the above-identified patent and that said Letters Patent is hereby corrected as shown below:

In the Specification

Column 4
Line 64, delete "dimercaptodiethyl sulfide," and insert -- dimercaptodiethylsulfide, --, therefor.
Lines 64-65, delete "dimercaptodiethyl sulfide," and insert -- dimercaptodiethylsulfide, --, therefor.
Lines 65-66, delete "dimercaptodiethyl sulfide," and insert -- dimercaptodiethylsulfide, --, therefor.

Column 5
Line 23, before "wherein" insert -- , --.
Line 60, before "wherein" insert -- , --.

Column 8
Line 26, delete "diallylphthalate:" and insert -- diallylphthalate; --, therefor.
Line 31, delete "benzene," and insert -- benzene; --, therefor.
Line 33, delete "ether:" and insert -- ether; --, therefor.

Signed and Sealed this  
Twenty-second Day of December, 2020

Andrei Iancu  
*Director of the United States Patent and Trademark Office*